(12) United States Patent
Frey et al.

(10) Patent No.: US 7,513,941 B2
(45) Date of Patent: Apr. 7, 2009

(54) PAVEMENT MARKING, REFLECTIVE ELEMENTS, AND METHODS OF MAKING MICOSPHERES

(75) Inventors: Matthew H. Frey, Cottage Grove, MN (US); Anatoly Z. Rosenflanz, Maplewood, MN (US); Kenton D. Budd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 571 days.

(21) Appl. No.: 11/273,513

(22) Filed: Nov. 14, 2005

(65) Prior Publication Data

US 2007/0110960 A1    May 17, 2007

(51) Int. Cl.
*C09D 1/00* (2006.01)
*C09D 4/00* (2006.01)
*C09D 5/00* (2006.01)
*C09D 11/00* (2006.01)
*C09K 3/00* (2006.01)
*C03C 12/00* (2006.01)
*C03C 12/02* (2006.01)

(52) U.S. Cl. .................. 106/31.04; 501/33; 501/34
(58) Field of Classification Search ............ 501/33, 501/34; 106/31.04
See application file for complete search history.

(56) References Cited

U.S. PATENT DOCUMENTS

| | | | |
|---|---|---|---|
| 3,254,563 A | 6/1966 | De Vries et al. | |
| 3,272,827 A | 9/1966 | Pesson | |
| 3,418,896 A | 12/1968 | Rideout | |
| 3,493,403 A | 2/1970 | Tung et al. | |
| 3,946,130 A * | 3/1976 | Tung et al. | 428/325 |
| 4,248,932 A | 2/1981 | Tung et al. | |
| 4,657,595 A | 4/1987 | Russell | |
| 4,758,469 A | 7/1988 | Lange | |
| 4,772,511 A | 9/1988 | Wood et al. | |
| 4,921,754 A | 5/1990 | Ishihara | |
| 4,988,541 A | 1/1991 | Hedblom | |
| 4,988,555 A | 1/1991 | Hedblom | |
| 5,227,221 A | 7/1993 | Hedblom | |
| 5,286,682 A * | 2/1994 | Jacobs et al. | 501/34 |
| 5,516,227 A * | 5/1996 | Kozak et al. | 404/9 |
| 5,716,706 A | 2/1998 | Morris | |
| 5,759,928 A | 6/1998 | Harper | |

(Continued)

FOREIGN PATENT DOCUMENTS

AT    364475    10/1981

(Continued)

OTHER PUBLICATIONS

Page 956 from Hawley's Condensed Chemical Dictionary, 13$^{th}$ Ed., 1997.

(Continued)

*Primary Examiner*—Karl E Group
*Assistant Examiner*—Noah S Wiese
(74) *Attorney, Agent, or Firm*—Sandra K Nowak (57) ABSTRACT

Presently described are retroreflective articles, such as pavement markings, that comprise transparent microspheres partially embedded in a (e.g. polymeric) binder. Also described are (e.g. glass-ceramic) microspheres, methods of making microspheres, as well as compositions of glass materials and compositions of glass-ceramic materials. The microspheres generally comprise lanthanide series oxide(s), titanium oxide ($TiO_2$), and optionally zirconium oxide ($ZrO_2$).

17 Claims, 2 Drawing Sheets

U.S. PATENT DOCUMENTS

| | | | |
|---|---|---|---|
| 5,774,265 A | | 6/1998 | Mathers et al. |
| 5,777,791 A | | 7/1998 | Hedblom et al. |
| 5,853,851 A | * | 12/1998 | Morris ................. 428/149 |
| 5,917,652 A | | 6/1999 | Mathers et al. |
| 6,245,700 B1 | | 6/2001 | Budd et al. |
| 6,365,262 B1 | | 4/2002 | Hedblom et al. |
| 6,514,892 B1 | * | 2/2003 | Kasai et al. ............... 501/34 |
| 2004/0259713 A1 | | 12/2004 | Frey et al. |
| 2005/0143248 A1 | | 6/2005 | Frey et al. |
| 2005/0158461 A1 | | 7/2005 | Bescup et al. |

FOREIGN PATENT DOCUMENTS

| | | |
|---|---|---|
| EP | 0474354 | 7/1996 |
| GB | 1233512 | 5/1971 |
| JP | 60-33229 | 2/1985 |
| WO | WO 96/33139 | 10/1996 |
| WO | WO 98/47830 | 10/1998 |
| WO | WO 03/011776 | 2/2003 |
| WO | WO-03/011776 A1 * | 2/2003 |

OTHER PUBLICATIONS

Shimizu et al., Application of $La_2O_3$—$TiO_2$ Porous Glass-Ceramic System to a Humidity Sensor; 1987, pp. 64-67.

Journal of Inorganic Materials, vol. 17, No. 2, Mar. 2002, $La_2O_3$ MgO—$Al_2O_3$—$SiO_2$—$TiO_2$.

White et al.; A lanthanum titanium porous glass ceramic; Journal of Materials Science 18 (1983) pp. 3409-3414.

Shishido et al.; Ln—M—O glasses obtained by rapid quenching using a laser beam; Journal of Materials Science 13 (1978), pp. 1006-1014.

T. Yamaguchi, "Refractive Index Measurement of High Refractive Index Beads," Applied Optics vol. 14, No. 5, pp. 1111-1115 (1975).

Treibacher Industrie AG data sheet, Gadolinium Oxide Gd2O3.

Treibacher Industrie AG data sheet, Lanthanum Oxide La2O3.

* cited by examiner

PAVEMENT MARKING, REFLECTIVE ELEMENTS, AND METHODS OF MAKING MICOSPHERES

FIELD

The invention relates to articles such as retroreflective pavement markings and other retroreflective articles as well as retroreflective elements comprising microspheres, methods of making microspheres, microspheres, and compositions of glass as well as glass-ceramic materials.

BACKGROUND

Transparent glass and glass-ceramic microspheres (i.e., beads) are used as optical elements for retroreflective signage, apparel, and pavement markings. Such microspheres can be produced, for example, by melting methods. Such melting methods may include melting a raw material mixture in the form of particulate material. The melted particles can be quenched, in air or water for example, to give solid beads. Optionally, quenched particles can be crushed to form particles of a smaller desired size for the final beads. The crushed particles can be passed through a flame having a temperature sufficient to melt and spheroidize them. For many raw material compositions this is a temperature of about 1500° C. to about 3000° C. Alternatively, the melted raw material composition can be poured continuously into a jet of high velocity air. Molten droplets are formed as the jet impinges on the liquid stream. The velocity of the air and the viscosity of the melt are adjusted to control the size of the droplets. The molten droplets are rapidly quenched, in air or water for example, to give solid beads. Beads formed by such melting methods are normally composed of a vitreous material that is essentially completely amorphous (i.e., noncrystalline), and hence, the beads are often referred to as "vitreous," "amorphous," or simply "glass" beads or microspheres.

Pavement markings including microspheres prepared from compositions that comprise lanthanum oxide and titanium oxide are described for example in U.S. Pat. No. 3,946,130 (Tung) and WO 96/33139.

SUMMARY

In one embodiment, a method of marking a pavement surface is described comprising providing a pavement surface and applying a pavement marking on the pavement surface. The pavement marking comprises transparent microspheres at least partially embedded in a binder wherein the micropheres comprise at least 40 wt-% $TiO_2$, and at least 10 wt-% $La_2O_3$; and the microspheres have an index of refraction of at least 2.10.

In another embodiment, the pavement marking comprises transparent microspheres at least partially embedded in a binder wherein the micropheres comprise at least 50 mol-% $TiO_2$, at least 5 mol-% of one or more metal oxides selected from oxides of the lanthanide series elements; and the microspheres have an index of refraction of at least 2.10.

In another embodiment, the pavement marking comprises transparent micropheres at least partially embedded in a binder. At least a portion of the micropheres comprise at least 50 mol-% $TiO_2$, at least 5 mol-% $Y_2O_3$, and optionally at least 5 mol-% zirconia, hafnia, thoria, and mixtures thereof.

In another embodiment, a retroreflective element is described. The retroreflective elements comprise the microspheres described herein partially embedded in an organic or inorganic core.

In other embodiments, methods of producing microspheres are described. The method comprises providing materials of the starting compositions described herein, melting the starting materials with a flame at a flame temperature of less than 2700° C. to form molten droplets, cooling the molten droplets to form quenched fused microspheres, and optionally heating the quenched fused microspheres.

In other embodiments, retroreflective articles, (e.g. glass-ceramic) microspheres, as well as glass compositions and glass-ceramic compositions are described.

For each embodiment that includes microspheres, the microspheres may have an index of refraction of at least 2.20, at least 2.30 or at least 2.40. The micropheres may comprise a glass-ceramic structure. The composition may comprise 45 wt-% to 70 wt-% $TiO_2$; 20 wt-% to 55 wt-% of $La_2O_3$; or one or more metal oxides selected from oxides of the lanthanide series elements; and 5 to 25 wt-% $ZrO_2$, $HfO_2$, $ThO_2$, and mixtures thereof. The composition may comprises at least 25 wt-% $La_2O_3$ or one or more metal oxides selected from oxides of the lanthanide series elements. The composition may comprise at least 50 wt-% or at least 60 wt-% $TiO_2$. The composition may comprise 5 wt-% to 10 wt-% $ZrO_2$, $HfO_2$, $ThO_2$, and mixtures thereof.

One exemplary composition comprises 60 wt-% to 65 wt-% $TiO_2$, 25 wt-% to 35 wt-% of $La_2O_3$ or one or more metal oxides selected from oxides of the lanthanide series elements; and 5 to 10 wt-% $ZrO_2$, $HfO_2$, $ThO_2$ and mixtures thereof.

DETAILED DESCRIPTION OF PREFERRED EMBODIMENTS

Presently described are retroreflective articles, such as pavement markings, that comprise transparent microspheres partially embedded in a (e.g. polymeric) binder. Also described are (e.g. glass-ceramic) microspheres, methods of making microspheres, as well as compositions of glass materials and compositions of glass-ceramic materials. The microspheres generally comprise lanthanide series oxide(s) (e.g. $La_2O_3$), titanium oxide ($TiO_2$), and optionally zirconium oxide ($ZrO_2$). This base composition will be referred to herein as "LTZ". Beads that include the LTZ base composition will be referred to as "LTZ beads" or "LTZ microspheres."

The terms "beads" and "microspheres" are used interchangeably and refer to particles that are substantially spherical.

The term "solid" refers to beads that are not hollow, i.e., free of substantial cavities or voids. For use as lens elements, the beads are preferably spherical and preferably solid (i.e. non-porous). Solid beads are typically more durable than hollow beads. Solid beads can also focus light more effectively than hollow beads, leading to higher retroreflectivity.

The microspheres described herein are preferably transparent. The term "transparent" means that the beads when viewed under an optical microscope (e.g., at 100×) have the property of transmitting rays of visible light so that bodies beneath the beads, such as bodies of the same nature as the beads, can be clearly seen through the beads when both are immersed in oil of approximately the same refractive index as the beads. Although the oil should have an index of refraction approximating that of the beads, it should not be so close that the beads seem to disappear (as they would in the case of a perfect index match). The outline, periphery, or edges of bodies beneath the beads are clearly discernible.

The recitation of numerical ranges by endpoint includes all numbers subsumed within the range (e.g. the range 1 to 10 includes, for example, 1, 1.5, 3.33, and 10).

Beads of the present invention are particularly useful as lens elements in retroreflective articles. Transparent beads according to the present invention typically have an index of refraction of at least 2.10. For retroreflective applications in water or a wet environment, the beads preferably have a high index of refraction of at least 2.20, of at least 2.25, of at least 2.30, of at least 2.35, and preferably of at least about 2.40.

Although high index of refraction glass beads have been demonstrated in the past for compositions comprising large amounts of titania as well (U.S. Pat. No. 3,493,403), such beads were prepared with a plasma torch that provided a fusion temperature reported to be in excess of 5000° F. (2760° C.). Also, such beads were prepared from particles less than 90 micrometers in size. Finally, such transparent fused beads were formed by rapidly quenching in water. Particles less than 90 micrometers in size heat rapidly in a plasma torch, and also quench at higher rates than larger particles, due to increasing heat transfer with decrease in a particle size. Thus, compositions that can be heated and quenched into a transparent bead less than 90 micrometers in diameter, using a plasma torch and water quenching, are often not suitable for preparation of transparent beads with larger sizes, using lower temperature fusion equipment and air-quenching. In many applications, it is desired to prepare quenched fused beads with size larger than 90 micrometers. For practical and low-cost manufacturing, it is desirable to use compositions that take advantage of equipment that provides a fusion temperature less than 2760° C. (e.g., less than 2700° C., less than 2600° C., less than 2500° C., less than 2400° C., less than 2300° C., less than 2200° C., less than 2100° C., less than 2000° C.). For example, it is particularly advantageous if a solid transparent bead can be formed using a flame produced by the combustion of natural gas with air, which is characterized by an adiabatic flame temperature of approximately 1980° C. It is also desirable to use equipment that provides only air-quenching. Thus, the present invention provides compositions with exceptional melting and glass-forming properties, making them useful for forming beads with size ranging above 90 micrometers (e.g., 100 micrometers, 150 micrometers, 200 micrometers), using combustion flame fusion processes and air-quenching.

In addition to the advantages of being conveniently melted and quenched to form transparent beads and having high index of refraction, beads of the current invention, when not doped intentionally to develop color, also exhibit higher whiteness, making them especially useful for white retroreflective sheeting and white retroreflective pavement markings. By higher whiteness, what is meant is that the beads appear less colored than past beads of such high index of refraction, for example beads comprising mainly alkaline earth oxides, titania and zirconia.

Articles of the invention share the common feature of comprising the LTZ beads described herein and/or a reflective element comprising such beads at least partially embedded in a core. At least a portion of the LTZ beads and/or reflective elements are exposed on the viewing surface of the article (e.g. pavement marking). The microspheres and/or reflective elements are preferably embedded in the core at a depth ranging from about 30% to about 60% of their diameters.

The pavement markings of the invention comprise a binder. In some aspects, the binder affixes the microspheres or the elements comprising microspheres to a pavement surface. Pavement surfaces are typically substantially solid and include a major portion of inorganic materials. Typically pavement surfaces include asphalt, concrete, and the like. The binder typically comprises a paint, a thermoplastic material, thermoset material, or other curable material. Common binder materials include polyacrylates, methacrylates, polyolefins, polyurethanes, polyepoxide resins, phenolic resins, and polyesters. For reflective pavement marking paints the binder may comprise reflective pigment.

For reflective sheeting that is suitable for reflective signage, apparel, or other uses, the binder that affixes the beads is typically transparent. Transparent binders are applied to a reflective base or may be applied to a release-coated support, from which after solidification of the binder, the beaded film is stripped and may subsequently be applied to a reflective base or be given a reflective coating or plating.

The reflective elements comprising microspheres and/or the microspheres of the invention are typically coated with one or more surface treatments that alter the pavement marking binder wetting properties and/or improve the adhesion of the reflective elements comprising microspheres or the microspheres in the binder. The reflective elements are preferably embedded in the pavement marking binder to about 20-40%, and more preferably to about 30% of their diameters such that the reflective elements are adequately exposed. Surface treatments that control wetting include various fluorochemical derivatives such as commercially available from Du Pont, Wilmington, Del. under the trade designation "Krytox 157 FS". Various silanes such as commercially available from OSI Specialties, Danbury, Conn. under the trade designation "Silquest A-1100" are suitable as adhesion promoters.

Figure 1:
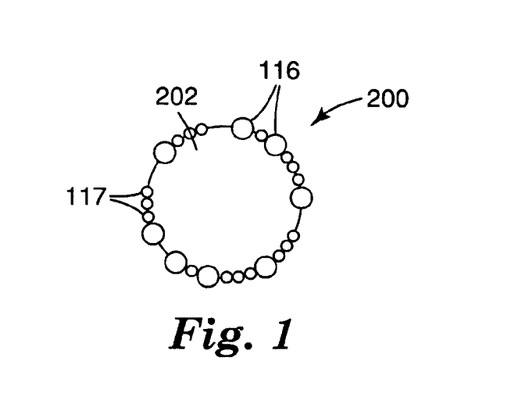
FIG. 1 is a cross-sectional view of an illustrative retroreflective element in accordance with the invention.

With reference to FIG. 1, retroreflective element 200 comprises LTZ microspheres 117 alone or in combination with low index bead 116 partially embedded in the surface of a core 202. The core is typically substantially larger than the beads. For example the average core diameter may range from about 0.2 to about 10 millimeters.

The core may comprise an inorganic material. Glass-ceramics are also useful as a core material. The crystalline phase acts to scatter light resulting in a semi-transparent or opaque appearance. Alternatively, the core may comprise an organic material such as a thermoplastic or bonded resin core, i.e. a crosslinked cured resin such as an epoxy, polyurethanes, alkyds, acrylics, polyesters, phenolics and the like. Various epoxies, polyurethane, and polyesters are generally described in U.S. Pat. Nos. 3,254,563; 3,418,896 and 3,272,827. The core may be a composite comprising an inorganic particle that is coated with an organic material. In the latter case, the organic material serves as a binder to affix the beads to the outside surface of the core.

Although the retroreflective elements may be prepared from a non-diffusely reflecting bonded resin core in combination with specularly reflecting microspheres (e.g. vapor coating the microspheres with aluminum), this approach results in less durable retroreflective elements due to the use of metal which may be susceptible to chemical degradation.

Less durable retroreflective elements would also result by incorporating metals (e.g. aluminum) into the core. In preferred embodiments, the retroreflective elements comprise at least one non-metallic light scattering material dispersed within core. The retroreflectance $R_A$ of the reflective elements for an entrance angle of −4° and a 0.2° obervation angle is typically at least about 3 (Cd/m$^2$)/lux and preferably at least about 7 (cd/m$^2$)/lux, when submerged in water.

Reflective elements may be made by known processes, such as described in U.S. Pat. Nos. 5,917,652; 5,774,265, and 2005/0158461-A1.

Figure 2:
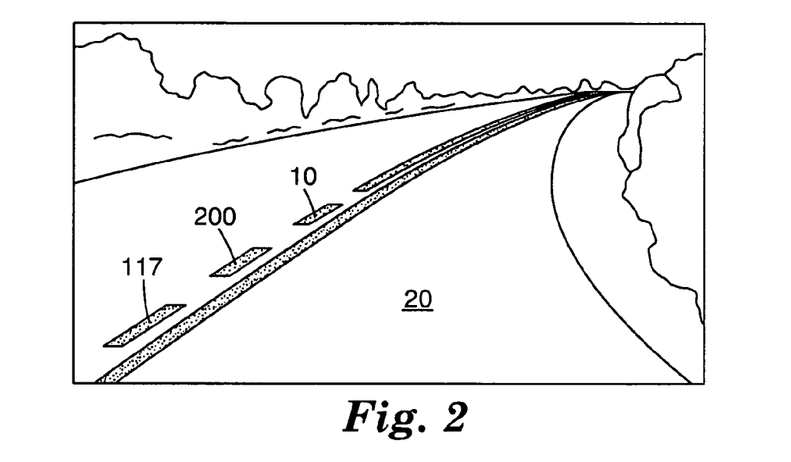
FIG. 2 is a perspective view of an illustrative pavement marking.

In some aspects, the beads and/or reflective elements are employed in liquid-applied marking (e.g. pavement) applications. With reference to FIG. 2, the beads 117 and/or reflective elements 200 are sequentially or concurrently dropped onto a liquified binder 10 or compounded within a liquified binder that is provided on pavement surface 20.

In other aspects, beads and/or reflective elements are employed in retroreflective sheeting including exposed lens, encapsulated lens, embedded lens, or enclosed lens sheeting. Representative pavement-marking sheet material (tapes) are described in U.S. Pat. No. 4,248,932 (Tung et al.), U.S. Pat. No. 4,988,555 (Hedblom); U.S. Pat. No. 5,227,221 (Hedblom); U.S. Pat. No. 5,777,791 (Hedblom); and U.S. Pat. No. 6,365,262 (Hedblom).

Pavement marking sheet material generally includes a backing, a layer of binder material, and a layer of beads partially embedded in the layer of binder material. The backing, which is typically of a thickness of less than about 3 millimeters, can be made from various materials, e.g., polymeric films, metal foils, and fiber-based sheets. Suitable polymeric materials include acrylonitrile-butadiene polymers, millable polyurethanes, and neoprene rubber. The backing can also include particulate fillers or skid resistant particles. The binder material can include various materials, e.g., vinyl polymers, polyurethanes, epoxides, and polyesters, optionally with colorants such as inorganic pigments, including specular pigments. The pavement marking sheeting can also include an adhesive, e.g., a pressure sensitive adhesive, a contact adhesive, or a hot melt adhesive, on the bottom of the backing sheet.

Pavement markings typically exhibit an initial $R_L$ according to ASTM E 1710-97 of at least 300 millicandelas/m$^2$/lux, preferably at least 500 millicandelas/m$^2$/lux, more preferably at least 800 millicandelas/m$^2$/lux, and even more preferably at least 1000 millicandelas/m$^2$/lux.

Patterned retoreflective (e.g. pavement) markings advantageously provide vertical surfaces, e.g., defined by protrusions, in which the microspheres are partially embedded. Because the light source usually strikes a pavement marker at high entrance angles, the vertical surfaces, containing embedded microspheres, provide for more effective retroreflection. Vertical surfaces also tend to keep the microspheres out of the water during rainy periods thereby improving retroreflective performance.

Figure 3:
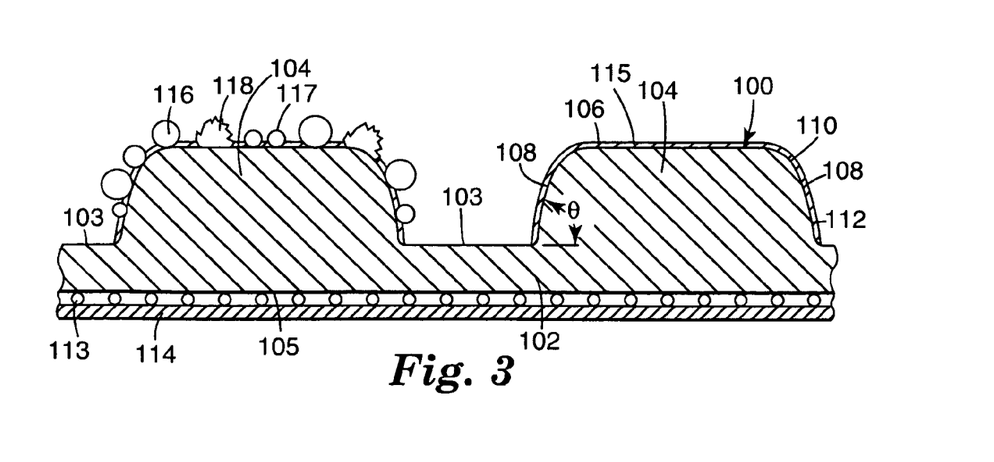
FIG. 3 is a cross-sectional view of an illustrative pavement marking tape of the invention.

For example, FIG. 3 shows patterned pavement marker 100 containing a (e.g. resilient) polymeric base sheet 102 and a plurality of protrusions 104. For illustrative purposes, only one protrusion 104 has been covered with microspheres and antiskid particles. Base sheet 102 has front surface 103 from which the protrusions extend, and back surface 105. Base sheet 102 is typically about 1 millimeter (0.04 inch) thick, but may be of other dimension if desired. Optionally, maker 100 may further comprise scrim 113 and/or adhesive layer 114 on back surface 105. Protrusion 104 has top surface 106, side surfaces 108, and in an illustrative embodiment is about 2 millimeters (0.08 inch) high. Protrusions with other dimensions may be used if desired. As shown, side surfaces 108 meet top surface 106 at a rounded top portions 110. Side surfaces 108 preferably form an angle θ of about 70° at the intersection of front surface 103 with lower portion 112 of side surfaces 108. Protrusion 104 is coated with pigment-containing binder layer 115. Embedded in binder layer 115 are a plurality of LTZ microspheres 117 and a plurality of a second microspheres 116 (e.g. having a lower refractive index than the LTZ microspheres). Optionally, antiskid particles 118 may be embedded on binder layer 115.

Pavement marking sheetings can be made by a variety of known processes. A representative example of such a process includes coating onto a backing sheet a mixture of resin, pigment, and solvent, dropping beads according to the present invention onto the wet surface of the backing, and curing the construction. A layer of adhesive can then be coated onto the bottom of the backing sheet. U.S. Pat. No. 4,988,541 (Hedblom) discloses a preferred method of making patterned pavement markings and is incorporated herein by reference in its entirety. Optionally, a scrim (e.g., woven or nonwoven) and/or an adhesive layer can be attached to the back side of the polymeric base sheet, if desired.

In some embodiments of the invention, two types of microspheres are employed wherein one type are the LTZ beads described herein and the second type are "low index microspheres," having for example a refractive index ranging from about 1.5 to about 2.0. In some aspects, one of the two types of microspheres will be larger. For instance, the optional low index microspheres may range in diameter from 175 to 250 micrometers in diameter while the LTZ microspheres are about 50 to 100 micrometers in diameter. In such case, the smaller LTZ microspheres may be disposed between the larger low index microspheres. As a result, the LTZ microspheres are protected against abrasion caused by repeated traffic wear. Alternatively, however, the LTZ microspheres can be chosen to be larger than the optional low index microspheres. Typically, the larger microspheres will cover more than about 50 percent of the retroreflective portion of the pavement marking surface area.

The optional low index microspheres are typically present in an amount of at least 25 weight percent, and preferably from about 35 to about 85 weight percent of the total amount of microspheres used. The LTZ microspheres are typically present from 15 to about 75 weight percent. These ranges are preferred because they provide a good balance between dry and wet retroreflectivity and provide good abrasion resistance.

The microspheres are preferably placed selectively on the side and top surfaces of the protrusions while leaving the valleys between protrusions substantially clear so as to minimize the amount of microspheres used, thereby minimizing the manufacturing cost. The microspheres may be placed on any of the side surfaces as well as the top surface of the protrusions to achieve efficient retroreflection.

The binder layer of FIGS. 2 and 3 as well as the core of the retroreflective element depicted in FIG. 1 comprise a light transmissive material so that light entering the retroreflective article is not absorbed but is instead retroreflected by way of scattering or reflection off of pigment particles in the light-transmissive material. Vinyls, acrylics, epoxies, and urethanes are examples of suitable mediums. Urethanes, such as are disclosed in U.S. Pat. No. 4,988,555 (Hedblom) are preferred binder mediums at least for pavement markings. The binder layer preferably covers selected portions of the protrusions so that the base sheet remains substantially free of the binder. For ease of coating, the medium will preferably be a liquid with a viscosity of less than 10,000 centipoise at coating temperatures.

The binder layer of FIGS. 2 and 3 as well as the core of FIG. 1 typically comprise at least one pigment such as a diffusely reflecting or specularly reflecting pigment.

Specular pigment particles are generally thin and plate-like and are part of the binder layer, the organic core (a core comprising essentially only an organic binder material) of an element, or an organic binder coating on an inorganic particle that together make up a composite core of an element. Light striking the pigment particles is reflected at an angle equal but opposite to the angle at which it was incident. Suitable examples of specular pigments for use in the present invention include pearlescent pigments, mica, and nacreous pigments. Typically, the amount of specular pigment present in the binder layer is less than 50 percent by weight. Preferably, the specular pigments comprise about 15 percent to 40 percent of the binder layer by weight, this range being the optimum amount of specular pigment needed for efficient retroreflection. Pearlescent pigment particles are often preferred because of the trueness in color.

In lieu of or in addition to combining transparent beads with a reflective (e.g. pigment containing) binder and/or element core, the beads may comprise a reflective (e.g. metallic) coating. Preferably, the metallic coating is absent from the portion of the outside surface of the bead that oriented to receive the light that is to be retroreflected, and present on the portion of the outside surface of the bead that is oriented opposite to the direction from which light that is to be retroreflected is incident. For example, in FIG. 1, a metallic coating may be advantageously placed at the interface between bead 117 and core 202. In FIG. 3, a reflective layer may be advantageously placed at the interface between the bead 117 and the binder 115 such as shown in U.S. Pat. No. 6,365,262. Metallic coatings may be placed on beads by physical vapor deposition means, such as evaporation or sputtering. Full coverage metallic coatings that are placed on beads can be partially removed by chemical etching.

The components of the beads are described as oxides, i.e. the form in which the components are presumed to exist in the completely processed glass and glass-ceramic beads as well as retroreflective articles, and the form that correctly accounts for the chemical elements and the proportions thereof in the beads. The starting materials used to make the beads may include some chemical compound other than an oxide, such as a carbonate. Other starting materials become modified to the oxide form during melting of the ingredients. Thus, the compositions of the beads of the present invention are discussed in terms of a theoretical oxide basis. The compositions described herein are reported on a theoretical oxide basis based on the amounts of starting materials used. These values do not necessarily account for fugitive materials (e.g. fugitive intermediates) that are volatilized during the melting and spheroidizing process.

The compositions of beads, discussed in terms of a theoretical oxide basis, can be described by listing the components together with their weight percent (wt-%) concentrations or their mole percent (mol-%) concentrations in the bead. Listing mol-% concentrations of components demands care to be explicit about the chemical formulae to which the mol % figures are being applied. For example, in certain circumstances, it is convenient to describe lanthanum oxide by the chemical formula $La_2O_3$; however, in other circumstances it is more convenient to describe lanthanum oxide by the chemical formula $LaO_{3/2}$. The latter notation is an example of an approach where the chemical formula for a metal oxide comprising a single metal is adjusted to yield a single metal atom per formula unit and whatever quantity of oxygen atoms (even if fractional) is required to reflect accurately the overall stoichiometry of the metal oxide. For compositions expressed herein in terms of concentrations given in units of mol-% of metal oxides, the mol-% figures relate to such formula units that include a single, unitary metal atom. Microspheres according to the present invention comprise at least 40 wt-% titania (e.g. 41 wt-%, 42 wt-%, 43 wt-%, 44 wt-%), preferably at least 45 wt-% titania (e.g. 46 wt-%, 47 wt-%, 48 wt-%, 49 wt-%), and more preferably at least 50 wt-% titania (e.g. 51 wt-%, 52 wt-%, 53 wt-%, 54 wt-%, 55 wt-%, 56 wt-%, 57 wt-%, 58 wt-%, 59 wt-%). The amount of titania for the microspheres is typically less than 80 wt-% (e.g. 79 wt-%, 78 wt-%, 77 wt-%, 76 wt-%, 75 wt-%, 74 wt-%, 73 wt-%, 72 wt-%, 71 wt-%) and preferably no greater than 70 wt-% (e.g. 69 wt-%, 68 wt-%, 67 wt-%, 66 wt-%). The amount of titania in at least some embodiments ranges from 60 wt-% to 65 wt-% (e.g. 61 wt-%, 62 wt-%, 63 wt-%, 64 wt-%).

Titania is a high index of refraction metal oxide with a melting point of 1840° C., and is typically used because of its optical and electrical properties, but not generally for hardness or strength. Similar to zirconia, titania is a strong nucleating agent known to cause crystallization of glass materials. Despite its high individual melting point, as a component in a mixture of certain oxides, titania can lower the liquidus temperature, while significantly raising the index of refration of microspheres comprising such mixtures of oxides. Compositions of the present invention comprising titania and optionally zirconia provide relatively low liquidus temperatures, very high index of refraction values, high crystallinity when heat-treated appropriately, useful mechanical properties, and high transparency.

In some embodiments, microspheres described herein comprise at least 10 wt-% (e.g. 11 wt-%, 12 wt-%, 13 wt-%, 14 wt-%) lanthanum oxide. For some embodiments, the amount of lanthanum oxide is at least 15 wt-% (e.g. 16 wt-%, 17 wt-%, 18 wt-%, 19 wt-%), at least 20 wt-% (e.g. 21 wt-%, 22 wt-%, 23 wt-%, 24 wt-%) or at least 25 wt-% (e.g. 26 wt-%, 27 wt-%, 28 wt-%, 29 wt-%, 30 wt-%, 31 wt-%, 32 wt-%, 33 wt-%, 34 wt-%). The amount of lanthanum oxide may range up to 60 wt-%. For some embodiments, the amount of lanthanum oxide ranges up to 55 wt-%. The amount of lanthanum oxide of some preferred embodiments ranges from 25 wt-% to 35 wt-%.

Lanthanum is one of a group of 15 chemically related elements in group IIIB of the periodic table (lanthanide series). The names and atomic numbers of the lanthanide series is as follows:

| Element | Symbol | Atomic No. |
| --- | --- | --- |
| Lanthanum | La | 57 |
| Cerium | Ce | 58 |
| Praseodymium | Pr | 59 |
| Neodymium | Nd | 60 |
| Promethium | Pm | 61 |
| Samarium | Sm | 62 |
| Europium | Eu | 63 |
| Gadolinium | Gd | 64 |
| Terbium | Tb | 65 |
| Dysprosium | Dy | 66 |
| Holmium | Ho | 67 |
| Erbium | Er | 68 |
| Thulium | Tm | 69 |

-continued

| Element | Symbol | Atomic No. |
|---|---|---|
| Ytterbium | Yb | 70 |
| Lutetium | Lu | 71 |

Although promethium is a rare earth element, such element is believed not to be naturally occurring on earth. Due to the expense of manufacturing, promethium oxide is less preferred. Similarly lanthanum and gadolinium tend to be preferred due to their greater availability. Lanthanum oxide, gadolinium oxide, and combinations thereof, may represent greater than 75 wt-% of the lanthanide series oxides of a material described herein. In some embodiments, lanthanum oxide, gadolinium oxide, and combinations thereof, represent at least 80 wt-%, at least 85 wt-%, at least 90 wt-%, at least 95 wt-%, and even 100% of the lanthanide series oxides.

In some embodiments, the microspheres may comprise oxides of other lanthanide series elements in place of or in combination with lanthanum oxide. Accordingly, the microspheres of the invention may comprise one or more oxides selected from oxides of the lanthanide series of elements. Any of the previous ranges provided with respect to lanthanum oxide content can be adjusted based on the molecular weight of the chosen combination of lanthanide series oxides to provide the same molar ratios. One preferred composition comprises 15 to 25 mol-% of one or more oxides selected from the oxides of the lanthanide series of elements; 4 to 8 mol-% zirconia, and 70 to 82 mol % titania.

The microspheres described herein optionally, yet typically comprise at least 2 wt-% zirconia. The amount of zirconia ranges up to 40 wt-%. The amount of zirconia is typically less than 30 wt-%. In one embodiment, the amount of zirconia ranges from about 5 wt-% to about 25 wt-%. The amount of zirconia is preferably no greater than 10 wt-%. Generally, the zirconia contributes chemical and mechanical durability as well as contributes to the high index of refraction of the preferred beads. As is commonly known, zirconia often includes some level of hafnia ($HfO_2$) contamination. Also, it is known that hafnia as well as thoria ($ThO_2$) can exhibit similar physical and chemical properties to those of zirconia. Accordingly, although beads of the present invention are described in terms of their content of zirconia, it will be appreciated by one of ordinary skill in the art that hafnia and thoria can be substituted in part or in whole for zirconia.

In one embodiment, the micropheres comprise 45 wt-% to 70 wt-% $TiO_2$, 20 wt-% to 55 wt-% $La_2O_3$, and 5 to 25 wt-% $ZrO_2$, $HfO_2$, $ThO_2$ and mixtures thereof.

In another embodiment, the microspheres compris 60 wt-% to 65 wt-% $TiO_2$, 25 wt-% to 35 wt-% $La_2O_3$, and 5 to 10 wt-% $ZrO_2$, $HfO_2$, $ThO_2$, and mixtures thereof.

The microspheres may comprise at least 75 wt-%, 80 wt-%, 85 wt-%, and even at least 90 wt-% $TiO_2$; lanthanide series oxides; and $ZrO_2$, $HfO_2$, $ThO_2$, and mixtures thereof.

In another embodiment, the pavement marking comprises transparent micropheres comprising at least 5 mol-% $Y_2O_3$ optionally in combination with one or more lanthanide series oxides; at least 50 mol-% $TiO_2$ and optionally at least 5 mol-% zirconia, hafnia, thoria, and mixtures thereof.

Microspheres described herein may comprise up to 25 wt-% (e.g. 1 wt-%, 2 wt-%, 3 wt-%, 4 wt-%, 5 wt-%, 6 wt-%, 7 wt-%, 8 wt-%, 9 wt-%, 10 wt-%, 11 wt-%, 12 wt-%, 13 wt-%, 14 wt-%) of other metal oxides. Such other metal oxides are selected as to not detract from the higher refractive index properties of the microsphers. Other metal oxides may be selected for addition with the purpose of lowering the melting point of the material, leading to easier processing. Suitable other metal oxides include for example $LiO_2$, $Na_2O$, $K_2O$, alkaline earth oxides such as BaO, SrO, MgO, and CaO, $Al_2O_3$, ZnO, $SiO_2$, and $B_2O_3$. Other metal oxides may be selected for addition with the purpose of improving the mechanical properties of the material. Typically, however, the amount of such other metal oxides is typically less than 15 wt-%, less than 10 wt-%, or less than 5 wt-%. In some preferred embodiments, the composition is substantially free (less than 1 wt-%) of any other metal oxides.

The glass-ceramic microspheres of the invention comprise one or more crystalline phases, typically totaling at least 5 volume %. Crystallinity is typically developed through heat-treatment of amorphous beads, although some glass-ceramic beads according to the invention and formed by quenching molten droplets may contain crystals without secondary heat treatment. Such a crystalline phase or phases may include relatively pure single-component metal oxide phases of titania (e.g., anatase, rutile) and/or zirconia (e.g., baddeleyite). Also, such a crystalline phase or phases may include relatively pure multicomponent metal oxide phases (e.g., $ZrTiO_4$). Such a crystalline phase or phases may include crystalline solid solutions that are isostructural with relatively pure single-component or multicomponent metal oxide phases. Finally, such crystalline phase or phases may include at least one heretofore unreported crystalline phase, in terms of crystal structure and/or composition. The compositions exhibit controlled crystallization characteristics such that they remain transparent following heat treatments.

Colorants can also be included in the beads of the present invention. Such colorants include, for example, $CeO_2$, $Fe_2O_3$, CoO, $Cr_2O_3$, NiO, CuO, $MnO_2$, $V_2O_5$ and the like. Typically, the beads of the present invention include no more than about 5% by weight (e.g. 1%, 2%, 3%, 4%) colorant, based on the total weight of the beads (theoretical oxide basis). Also, rare earth elements, such as praseodymium, neodymium, europium, erbium, thulium, ytterbium may optionally be included for color or fluorescence. Preferably, the microspheres are substantially free of lead oxide (PbO) and cadmium oxide (CdO).

The microspheres described herein can be prepared from a melt process. Microspheres prepared from a melt process are described herein as "fused." For ease in manufacturing, it is preferred that the microsphere composition exhibits a relatively low liquidus temperature, such as less than about 1700° C., and preferably less than about 1600° C. Typically the liquidus temperature is less than about 1500° C. Generally, formulations including those at or near a eutectic composition(s) (e.g., binary or ternary eutectic compositions) will have lowest melting points in the system and, therefore, will be particularly useful.

Upon initial formation from a melt, beads are formed that are substantially amorphous yet can contain some crystallinity. The compositions preferably form clear, transparent glass microspheres when quenched. Upon further heat treatment, the beads can develop crystallinity in the form of a glass-ceramic structure, i.e., microstructure in which crystals have grown from within an initially amorphous structure, and thus become glass-ceramic beads. Upon heat treatment of quenched beads, the beads can develop crystallinity in the form of a nanoscale glass-ceramic structure, i.e., microstructure in which crystals less than about 100 nanometers in dimension have grown from within an initially amorphous structure, and thus become glass-ceramic beads. A nanoscale glass-ceramic microstructure is a microcrystalline glass-ceramic structure comprising nanoscale crystals. It is also within the scope of the present invention to provide a transparent microbead that is mostly crystalline (i.e., greater than 50 vol-% crystalline) directly after quenching, thus bypassing a heat-treatment step. It is believed that in such cases, employed cooling rates are not high enough to preserve an amorphous structure, but are high enough to form nanocrystalline microstructure.

For the purposes of the present invention, microspheres exhibiting X-ray diffraction consistent with the presence of a crystalline phase are considered glass-ceramic microspheres. An approximate guideline in the field is that materials comprising less than about 1 volume % crystals may not exhibit detectable crystallinity in typical powder X-ray diffraction measurements. Such materials are often considered "X-ray amorphous" or glass materials, rather than ceramic or glass-ceramic materials. Microspheres comprising crystals that are detectable by X-ray diffraction measurements, typically necessary to be present in an amount greater than or equal to 1 volume % for detectability, are considered glass-ceramic microspheres for the purposes of the present invention. X-ray diffraction data can be collected using a Philips Automated Vertical Diffractometer with Type 150 100 00 Wide Range Goniometer, sealed copper target X-ray source, proportional detector, variable receiving slits, 0.2° entrance slit, and graphite diffracted beam monochromator (Philips Electronics Instruments Company, Mahwah, N.J.), with measurement settings of 45 kV source voltage, 35 mA source current, 0.040° step size, and 4 second dwell time. Likewise as used herein "glass microspheres" refers to microspheres having less than 1 volume % of crystals. Preferably, the glass-ceramic microspheres comprise greater than 10 volume % crystals. More preferably, the glass-ceramic microspheres comprise greater than 25 volume % crystals. Most preferably, the glass-ceramic microspheres comprise greater than 50 volume % crystals.

In preferred embodiments, the microspheres form a microcrystalline glass-ceramic structure via heat treatment yet remain transparent. For good transparency, it is preferable that the microspheres comprise little or no volume fraction of crystals greater than about 100 nanometers in dimension. Preferably, the microspheres comprise less than 20 volume % of crystals greater than about 100 nanometers in dimension, more preferably less than 10 volume %, and most preferably less than about 5 volume %. Preferably, the size of the crystals in the crystalline phase is less than about 20 nanometers (0.02 micrometers) in their largest linear dimension. Crystals of this size typically do not scatter visible light effectively, and therefore do not decrease the transparency significantly.

Beads of the invention can be made and used in various sizes. It is uncommon to deliberately form beads smaller than 10 micrometers in diameter, though a fraction of beads down to 2 micrometers or 3 micrometers in diameter is sometimes formed as a by-product of manufacturing larger beads. Accordingly, the beads are preferably at least 20 micrometers, (e.g. at least 50 micrometers, at least 100 micrometers, at least 150 micrometers.) Generally, the uses for high index of refraction beads call for them to be less than about 2 millimeters in diameter, and most often less than about 1 millimeter in diameter (e.g. less than 750 micrometers, less than 500 micrometers, less than 300 micrometers).

Glass microspheres according to the invention can be prepared by fusion processes as disclosed, for example, in U.S. Pat. No.3,493,403 (Tung et al). In one useful process, the starting materials are measured out in particulate form, each starting material being preferably about 0.01 micrometer to about 50 micrometer in size, and intimately mixed together. The starting raw materials include compounds that form oxides upon melting or heat treatment. These can include oxides, (e.g. titania, zirconia, and alkaline earth metal oxide(s)), hydroxides, acid chlorides, chlorides, nitrates, carboxylates, sulfates, alkoxides, and the like, and the various combinations thereof. Moreover, multicomponent metal oxides such as lanthanum titanate ($La_2TiO_5$) and barium titanate ($BaTiO_3$) can also be used.

Glass microspheres according to the invention can, alternatively, be prepared by other conventional processes as, for example, disclosed in U.S. Pat. No. 2,924,533 (McMullen et al) and in U.S. Pat. No. 3,499,745. The oxide mixture can be melted in a gas-fired or electrical furnace until all the starting materials are in liquid form. The liquid batch can be poured into a jet of high-velocity air. Beads of the desired size are formed directly in the resulting stream. The velocity of the air is adjusted in this method to cause a proportion of the beads formed to have the desired dimensions. Typically, such compositions have a sufficiently low viscosity and high surface tension. Typical sizes of beads prepared by this method range from several tenths of a millimeter to 3-4 millimeters.

Melting of the starting materials is typically achieved by heating at a temperature within a range of about 1500° C. to about 1900° C., and often at a temperature, for example, of about 1700° C. A direct heating method using a hydrogen-oxygen burner or acetylene-oxygen burner, or an oven heating method using an arc image oven, solar oven, graphite oven or zirconia oven, can be used to melt the starting materials.

Alternatively, the melted starting material is quenched in water, dried, and crushed to form particles of a size desired for the final beads. The crushed particles can be screened to assure that they are in the proper range of sizes. The crushed particles can then be passed through a flame having a temperature sufficient to remelt and spheroidize the particles.

In a preferred method, the starting materials are first formed into larger feed particles. The feed particles are fed directly into a burner, such as a hydrogen-oxygen burner or an acetylene-oxygen burner or a methane-air burner, and then quenched in water (e.g., in the form of a water curtain or water bath). Feed particles may be formed by melting and grinding, agglomerating, or sintering the starting materials. Agglomerated particles of up to about 2000 micrometers in size (the length of the largest dimension) can be used, although particles of up to about 500 micrometers in size are preferred. The agglomerated particles can be made by a variety of well known methods, such as by mixing with water, spray drying, pelletizing, and the like. The starting material, particularly if in the form of agglomerates, can be classified for better control of the particle size of the resultant beads. Whether agglomerated or not, the starting material may be fed into the burner with the burner flame in a horizontal orientation. Typically, the feed particles are fed into the flame at its base. This horizontal orientation is desired because it can produce very high yields (e.g., 100%) of spherical particles of the desired level of transparency.

The procedure for cooling the molten droplets can involve air cooling or rapid cooling. Rapid cooling is achieved by, for example, dropping the molten droplets of starting material into a cooling medium such as water or cooling oil. In addition, a method can be used in which the molten droplets are sprayed into a gas such as air or argon. The resultant quenched fused beads are typically sufficiently transparent for use as lens elements in retroreflective articles. For certain embodiments, they are also sufficiently hard, strong, and tough for direct use in retroreflective articles. A subsequent heat-treating step can improve their mechanical properties. Also, heat treatment and crystallization lead to increases in index of refraction.

In a preferred embodiment, a bead precursor can be formed and subsequently heated. As used herein, a "bead precursor" refers to the material formed into the shape of a bead by melting and cooling a bead starting composition. This bead precursor is also referred to herein as a quenched fused bead, and may be suitable for use without further processing if the mechanical properties, index of refraction, and transparency are of desirable levels. The bead precursor is formed by melting a starting composition containing prescribed amounts of raw materials (e.g., titanium raw material, optional raw materials), forming molten droplets of a predetermined particle size, and cooling those molten droplets. The starting composition is prepared so that the resulting bead precursor contains the desired metal oxides in predetermined proportions. The particle size of the molten droplets is normally within the range of about 10 micrometers to about 2,000 micrometers. The particle size of the bead precursors as well as the particle size of the final transparent fused beads can be controlled with the particle size of the molten droplets.

In certain preferred embodiments, a bead precursor (i.e., quenched fused bead) is subsequently heated. Preferably, this heating step is carried out at a temperature below the melting point of the bead precursor. Typically, this temperature is at least about 750° C. Preferably, it is about 850° C. to about 1000° C., provided it does not exceed the melting point of the bead precursor. If the heating temperature of the bead precursor is too low, the effect of increasing the index of refraction or the mechanical properties of the resulting beads will be insufficient. Conversely, if the heating temperature is too high, bead transparency can be diminished due to light scattering from large crystals. Although there are no particular limitations on the time of this heating step to increase index of refraction, develop crystallinity, and/or improve mechanical properties, heating for at least about 1 minute is normally sufficient, and heating should preferably be performed for about 5 minutes to about 100 minutes. In addition, preheating (e.g., for about 1 hour) at a temperature within the range of about 600° C. to about 800° C. before heat treatment may be advantageous because it can further increase the transparency and mechanical properties of the beads. Typically, and preferably, heat-treatment step is conducted in air or oxygen. These atmospheres are generally beneficial in improving color characteristic of beads, making them whiter. It is also within the scope of the present invention to conduct heat-treatment in an atmosphere other than air or oxygen.

The latter method of preheating is also suitable for growing fine crystal phases in a uniformly dispersed state within an amorphous phase. A crystal phase containing oxides of zirconium, titanium, etc., can also form in compositions containing high levels of zirconia or titania upon forming the beads from the melt (i.e., without subsequent heating). Significantly, the crystal phases are more readily formed (either directly from the melt or upon subsequent heat treatment) by including high combined concentrations of titania and zirconia (e.g. combined concentration greater than 70%).

Microspheres made from a melt process are characterized as "fused." Fully vitreous fused microspheres comprise a dense, solid, atomistically homogeneous glass network from which nanocrystals can nucleate and grow during subsequent heat treatment.

The crush strength values of the beads of the invention can be determined according to the test procedure described in U.S. Pat. No. 4,772,511 (Wood). Using this procedure, the beads demonstrate a crush strength of preferably at least about 350 MPa, more preferably at least about 700 MPa.

The durability of the beads of the invention can be demonstrated by exposing them to a compressed air driven stream of sand according to the test procedure described in U.S. Pat. No. 4,758,469 (Lange). Using this procedure, the beads are resistant to fracture, chipping, and abrasion, as evidenced by retention of about 30% to about 60% of their original retroreflected brightness.

EXAMPLES

The following provides an explanation of the present invention with reference to its examples and comparative examples. Furthermore, it should be understood that the present invention is no way limited to these examples. All percentages are in weight percents, based on the total weight of the compositions, unless otherwise specified.

Test Methods

1. Wet patch brightness values were determined using a retroluminometer. The device directs white light onto a planar monolayer of microspheres disposed on a white backing material at a fixed entrance angle to the normal to the monolayer. Retroreflective brightness, patch brightness, is measured by a photodetector at a fixed divergence angle to the entrance angle (observation angle) in units of $(Cd/m^2)/lux$. Data reported herein were measured at −4° entrance angle and 0.2° observation angle. Retroreflective brightness measurements were made for the purpose of comparison of brightness between beads of different composition. The values were normalized by dividing by a constant factor greater than the highest measured value. All measurements were made on samples with a layer of water with thickness about I millimeter on top of and in contact with the beads.

2. X-ray diffraction was used to determine the crystallinity for certain example microspheres. X-ray diffraction data can be collected using a Philips Automated Vertical Diffractometer with Type 150 100 00 Wide Range Goniometer, sealed copper target X-ray source, proportional detector, variable receiving slits, 0.2° entrance slit, and graphite diffracted beam monochromator (Philips Electronics Instruments Company, Mahwah, N.J.), with measurement settings of 45 kV source voltage, 35 mA source current, 0.04° step size, and 4 second dwell time.

3. Index of refraction of the microspheres was measured according to T. Yamaguchi, "Refractive Index Measurement of High Refractive Index Beads," Applied Optics Volume 14, Number 5, pages 1111-1115 (1975).

Examples 1-24

Starting Materials

The following starting materials were employed in the examples:

zirconium oxide—commercially available from Z-TECH division of Carpenter Engineering Products, Bow, N.H., under the trade designation "CF-PLUS-HM"

titanium oxide—commercially available from KRONOS Incorporated, Cranbury, N.J., under the trade designation "KRONOS 1000"

barium carbonate—commercially available from Chemical Products Corporation, Cartersville, Ga., under the trade designation "Type S"

lanthanum oxide—commercially available from Treibacher, Industrie Inc., Toronto, Ontario, Canada, under the trade designation "Lanthanum Oxide $La_2O_3$, 99.9%"

aluminum oxide—commercially available from ALCOA Industrial Chemicals, Pittsburgh, Pa., under the trade designation "16SG", and gadolinium oxide—commercially available from Treibacher, Industrie Inc., Toronto, Ontario, Canada, under the trade designation "Gadolinium Oxide $Gd_2O_3$, 99.99%"

Microsphere Preparation

For each example, the gram amounts of each metal oxide as specified in Table 1 as follows were combined in a 1 quart porcelain jar mill with 3 g of sodium carboxymethylcellulose (commercially available from the Aqualon Division of Hercules Incorporated, Hopewell, Va., under the trade designation "CMC 7L2C"), approximately 350 g of water, and approximately 1600 g of 1 cm diameter zirconium oxide milling media.

The resulting slurry was milled for approximately 24 hours and then dried overnight at 100° C. to yield a mixed powder cake with the components homogeneously distributed. After grinding with a mortar and pestle, the dried and sized particles (<212 microns diameter) were fed into the flame of a hydrogen/oxygen torch (commercially available from Bethlehem Apparatus Company, Hellertown, Pa. under the trade designation "Bethlehem Bench Burner PM2D Model-B"), referred to as "Bethlehem burner" hereinafter. The Bethlehem burner delivered hydrogen and oxygen at the following rates, standard liters per minute (SLPM):

|  | Hydrogen | Oxygen |
|---|---|---|
| Inner ring | 8.0 | 3.0 |
| Outer ring | 23.0 | 9.8 |
| Total | 31.0 | 12.8 |

The particles were melted by the flame and transported to a water quenching vessel, yielding fused microspheres. The quenched particles were dried and then passed through the flame of the Bethlehem burner a second time, where they were melted again and transported to the water quenching vessel. A portion of the quenched microspheres was heat-treated by heating at 10° C./minute to 850° C., holding at 850° C. for 1 hour, and furnace cooling.

Table 2 describes the theoretical bead composition for each example, accounting for decomposition of any carbonate that was present in the raw material batches. Table 2 also reports index of refraction values for quenched microspheres i) after flame-forming and ii) after furnace heat-treatment. Finally, Table 2 also reports the relative wet patch brightness values for heat-treated microspheres that were sieved to diameter less than 106 micrometers. Values of relative wet patch brightness for the sieved microspheres were approximately proportional the observed fraction of transparent microspheres present for each the samples, that ranged from approximately 1 percent to approximately 90 percent (i.e., greater fraction of transparent microspheres led to higher relative wet patch brightness values).

TABLE 1

| Example No. | $Gd_2O_3$ (g) | $La_2O_3$ (g) | $ZrO_2$ (g) | $TiO_2$ (g) | $Al_2O_3$ (g) | $BaCO_3$ (g) |
|---|---|---|---|---|---|---|
| 1 |  | 35.2 | 26.6 | 138.2 |  |  |
| 2 |  | 51.8 | 13.0 | 135.2 |  |  |
| 3 |  | 67.6 |  | 132.4 |  |  |
| 4 |  | 34.4 | 39.0 | 126.6 |  |  |
| 5 |  | 50.6 | 25.4 | 124.0 |  |  |
| 6 |  | 66.0 | 12.4 | 121.6 |  |  |
| 7 |  | 81.0 |  | 119.0 |  |  |
| 8 |  | 49.4 | 37.4 | 113.2 |  |  |
| 9 |  | 64.6 | 24.4 | 111.0 |  |  |
| 10 |  | 79.2 | 12.0 | 108.8 |  |  |
| 11 |  | 93.2 |  | 106.8 |  |  |
| 12 |  | 63.2 | 35.8 | 101.0 |  |  |
| 13 |  | 77.6 | 23.4 | 99.0 |  |  |
| 14 |  | 91.4 | 11.6 | 97.0 |  |  |
| 15 |  | 33.6 | 50.8 | 115.6 |  |  |
| 16 |  | 48.4 | 48.8 | 102.8 |  |  |
| 17 |  | 25.4 | 25.6 | 125.0 |  |  | 30.8 |
| 18 |  | 33.4 | 12.6 | 122.6 |  |  | 40.4 |
| 19 |  | 25.0 | 37.6 | 114.0 |  |  | 30.2 |
| 20 |  | 49.6 | 24.8 | 121.6 | 4.0 |  |
| 21 |  | 64.8 | 12.2 | 119.0 | 4.0 |  |
| 22 |  | 57.2 | 18.6 | 120.2 | 4.0 |  |
| 23 |  | 55.0 | 16.6 | 124.4 | 4.0 |  |
| 24 | 50.0 |  | 30.0 | 120.0 |  |  |

TABLE 2

| Example No. | $Gd_2O_3$ | $La_2O_3$ | $ZrO_2$ | $TiO_2$ | $Al_2O_3$ | BaO | Index of Refraction after Flame-Forming | Index of Refraction after Heat-Treatment | Wet Patch Brightness after Heat-Treatment (relative) |
|---|---|---|---|---|---|---|---|---|---|
| 1 |  | 17.6 | 13.3 | 69.1 |  |  | N/A | N/A | 0.03 |
| 2 |  | 25.9 | 6.5 | 67.6 |  |  | 2.39 | 2.48 | 0.23 |
| 3 |  | 33.8 |  | 66.2 |  |  | 2.37 | 2.44 | 0.69 |
| 4 |  | 17.2 | 19.5 | 63.3 |  |  | N/A | N/A | 0.03 |
| 5 |  | 25.3 | 12.7 | 62.0 |  |  | 2.40 | 2.44 | 0.94 |
| 6 |  | 33.0 | 6.2 | 60.8 |  |  | 2.39 | 2.43 | 0.95 |
| 7 |  | 40.5 |  | 59.5 |  |  | 2.35 | 2.34 | 0.18 |
| 8 |  | 24.7 | 18.7 | 56.6 |  |  | 2.36 | 2.41 | 0.93 |
| 9 |  | 32.3 | 12.2 | 55.5 |  |  | 2.34 | 2.35 | 0.51 |
| 10 |  | 39.6 | 6.0 | 54.4 |  |  | 2.34 | 2.34 | 0.80 |
| 11 |  | 46.6 |  | 53.4 |  |  | 2.31 | 2.32 | 0.61 |
| 12 |  | 31.6 | 17.9 | 50.5 |  |  | 2.33 | 2.33 | 0.78 |
| 13 |  | 38.8 | 11.7 | 49.5 |  |  | 2.31 | 2.32 | 0.73 |
| 14 |  | 45.7 | 5.8 | 48.5 |  |  | 2.28 | 2.31 | 0.66 |
| 15 |  | 16.8 | 25.4 | 57.8 |  |  | N/A | 2.35 | 0.10 |

TABLE 2-continued

| Example No. | Gd$_2$O$_3$ | La$_2$O$_3$ | ZrO$_2$ | TiO$_2$ | Al$_2$O$_3$ | BaO | Index of Refraction after Flame-Forming | Index of Refraction after Heat-Treatment | Wet Patch Brightness after Heat-Treatment (relative) |
|---|---|---|---|---|---|---|---|---|---|
| 16 |  | 24.2 | 24.4 | 51.4 |  |  | 2.33 | 2.37 | 0.65 |
| 17 |  | 12.7 | 12.8 | 62.5 |  | 12.0 | 2.33 | 2.37 | 0.87 |
| 18 |  | 16.7 | 6.3 | 61.3 |  | 15.7 | 2.33 | 2.39 | 0.78 |
| 19 |  | 12.5 | 18.8 | 57.0 |  | 11.7 | 2.31 | 2.38 | 0.10 |
| 20 |  | 24.8 | 12.4 | 60.8 | 2.0 |  | 2.34 | 2.42 | 0.75 |
| 21 |  | 32.4 | 6.1 | 59.5 | 2.0 |  | 2.31 | 2.39 | 0.82 |
| 22 |  | 28.6 | 9.3 | 60.1 | 2.0 |  | 2.34 | 2.44 | 0.78 |
| 23 |  | 27.5 | 8.3 | 62.2 | 2.0 |  | 2.33 | 2.43 | 0.88 |
| 24 | 25.0 |  | 15.0 | 60.0 |  |  | 2.32 | 2.42 | 0.11 |

Figure 4:
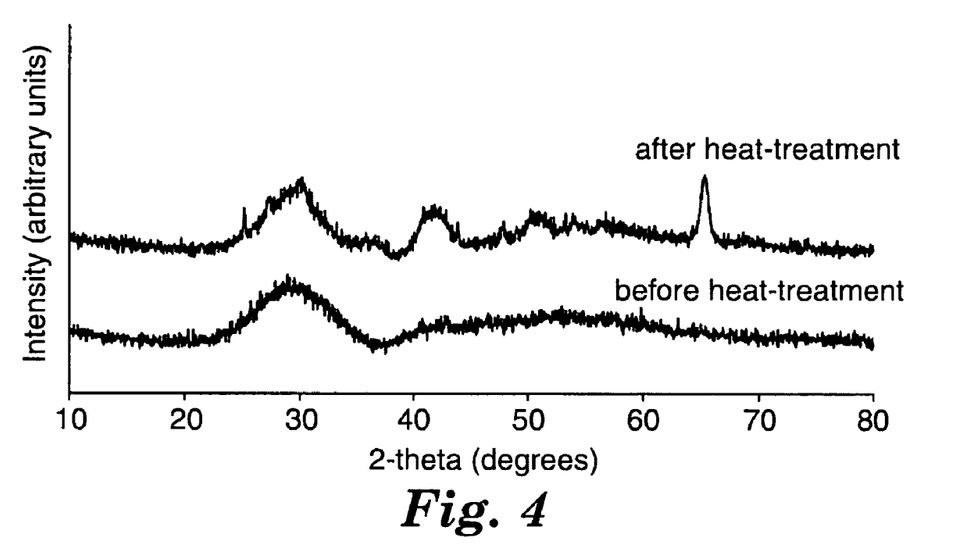
FIG. 4 is an X-ray diffraction plot for exemplary glass beads and exemplary glass-ceramic beads of the invention.

FIG. 4 gives a plot of measured X-ray diffraction data for microspheres of Example 18, sieved to less than 106 micrometers in diameter. Before heat-treatment, the microspheres are judged to be largely X-ray amorphous, with any crystallinity present at a level of less than 10% by volume. After heat-treatment, the transparent microspheres are judged to include approximately 40% crystallinity by volume, as evidenced by the appearance of crystalline features in the X-ray diffraction plot.

Example 25

Pavement Marking

A flat piece of asphalt-bonded aggregate paving cement measuring approximately 4 centimeters in thickness, approximately 8 centimeters by approximately 15 centimeters in area, and approximately 850 grams in mass was placed, together with an approximately 7.6 gram piece of yellow alkyd thermoplastic pavement marking binder resting on it (commercially available from Ennis Paint, Inc (Atlanta, Ga.) under the trade designation Pave-Mark Y5E-5), in a convection oven at 200° C. After heating at 200° C. for 45 minutes, the binder had softened and flowed to a relatively flat coating layer on the cement. Heat-treated microspheres of Example 17, sieved to less than 106 micrometers in diameter, were sprinkled on top of the hot binder-coated cement. Under an optical microscope, the microspheres were observed to have embedded into the binder to about half of their diameters. After the marked paving cement had cooled, it was observed from a distance of several meters with a flashlight for retroreflectivity. When dry, it displayed limited retroreflectively. When submerged in water, it displayed substantially greater, and easily observable, retroreflectivity.

Example 26

Pavement Marking

Figure 5:
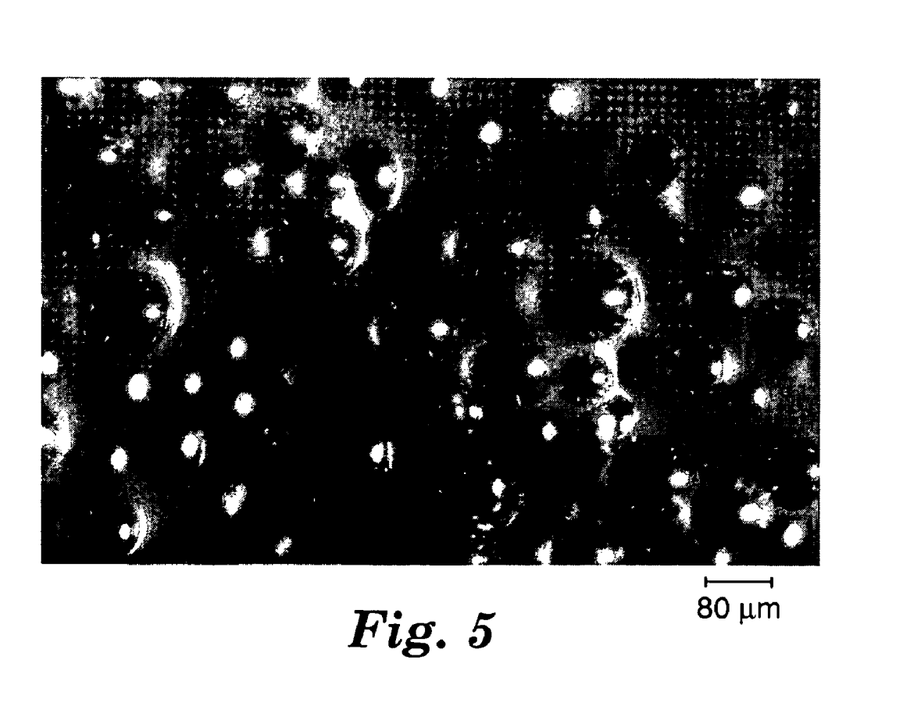
FIG. 5 is an optical photomicrograph of the surface of a retroreflective article demonstrating beads partially embedded in a binder.

A flat piece of portland cement-type paving material measuring approximately 2 centimeters in thickness, approximately 8 centimeters by approximately 9 centimeters in area, and approximately 270 grams in mass was placed, together with an approximately 15.6 gram piece of the yellow alkyd thermoplastic pavement marking binder resting on it, in a convection oven at 200° C. After heating at 200° C. for 25 minutes, the binder had softened and flowed to a relatively flat coating layer on the cement. Heat-treated microspheres of example 17, sieved to less than 106 micrometers in diameter, were sprinkled on top of the hot binder-coated cement. Under an optical microscope, the microspheres were observed to have embedded into the binder to about half of their diameters. FIG. 5 is an optical photomicrograph of the partially embedded beads. After the marked paving cement had cooled, it was observed from a distance of several meters with a flashlight for retroreflectivity. When dry, it displayed limited retroreflectively. When submerged in water, it displayed substantially greater, and easily observable, retroreflectivity.

What is claimed is:

1. A method of marking a pavement surface comprising:
   providing a pavement surface; and
   applying a pavement marking on the pavement surface, wherein the pavement marking comprises transparent microspheres at least partially embedded in a binder wherein at least a portion of the micropheres have an index of refraction of at least 2.10 and comprise
   at least 40 wt-% TiO$_2$;
   at least 10 wt-% La$_2$O$_3$; and
   wherein the microspheres of the portion comprise 5 wt-% to 15 wt-% of at least one metal oxide selected from ZrO$_2$, HfO$_2$, ThO$_2$, and mixtures thereof.

2. The method of claim 1 wherein the microspheres of the portion have an index of refraction of at least 2.30.

3. The method of claim 1 wherein the microspheres of the portion comprise a glass-ceramic structure.

4. The method of claim 1 wherein the microspheres of the portion comprise at least 25 wt-% La$_2$O$_3$.

5. The method of claim 1 wherein the micropheres of the portion comprise:
   45 wt-% to 70 wt-% TiO$_2$;
   20 wt-% to 55 wt-% La$_2$O$_3$, and
   5 to 15 wt-% of at least one metal oxide selected from ZrO$_2$, HfO$_2$, ThO$_2$, and mixtures thereof.

6. The method of claim 1 wherein the microspheres of the portion consist of 90 wt-% of at least one metal oxide selected from TiO$_2$, La$_2$O$_3$, ZrO$_2$, HfO$_2$, and ThO$_2$ and mixtures thereof.

7. The method of claim 1 wherein the microspheres of the portion comprise:
   60 wt-% to 65 wt-% TiO$_2$;
   25 wt-% to 35 wt-% La$_2$O$_3$; and
   5 to 15 wt-% of at least one metal oxide selected from ZrO$_2$, HfO$_2$, ThO$_2$ and mixtures thereof.

8. The method of claim 1 wherein the binder comprises a pigment selected from at least one diffusely reflecting pigment, at least one specularly reflecting pigment, and combinations thereof.

9. The method of claim 1 wherein the microspheres comprise a reflective coating.

10. The method of claim 1 wherein the pavement marking further comprises transparent microspheres having an index of refraction within the range of 1.5 to 2.0.

11. The method of claim 1 wherein the microspheres are fused.

12. The method of claim 1 wherein the microspheres are embedded in retroreflective elements.

13. The method of claim 1 wherein the pavement marking is a tape further comprising an adhesive and optionally a backing wherein the adhesive is contacted with the pavement surface.

14. A method of marking a pavement surface comprising:
   providing a pavement surface; and
   applying a retroreflective pavement marking on the pavement surface, wherein the pavement marking comprises transparent microspheres at least partially embedded in a binder; wherein at least a portion of the microspheres have an index of refraction of at least 2.10; and comprise at least 50 mol-% $TiO_2$ and at least 5 mol-% $Y_2O_3$.

15. The method of claim 14 wherein the microspheres of the portion comprise at least 5 mol-% of at least one metal oxide selected from $ZrO_2$, $HfO_2$, $ThO_2$, and mixtures thereof.

16. The method of claim 14 wherein the microspheres of the portion comprises at least 5 mol-% of at least one metal oxide selected from $La_2$, $O_3$, $Gd_2O_3$, and mixtures thereof.

17. A method of marking a pavement surface comprising:
   providing a pavement surface; and
   applying a retroreflective pavement marking on the pavement surface, wherein the pavement marking comprises transparent microspheres at least partially embedded in a binder wherein at least a portion the micropheres have an index of refraction of at least 2.10, and comprise 70 mol-% to 82 mol-% $TiO_2$, and 15 mol-% to 22 mol-% of one or more metal oxides selected from oxides of the lanthanide series elements and 4 mol-% to 8 mol-% of at least one metal oxide selected from $ZrO_2$, $HfO_2$, $ThO_2$, and mixtures thereof.

* * * * *

UNITED STATES PATENT AND TRADEMARK OFFICE
CERTIFICATE OF CORRECTION

PATENT NO. : 7,513,941 B2　　　　　　　　　　　　　　　　　　　　　　　　Page 1 of 2
APPLICATION NO. : 11/273513
DATED : April 7, 2009
INVENTOR(S) : Matthew H. Frey It is certified that error appears in the above-identified patent and that said Letters Patent is hereby corrected as shown below:

First Page, Column 1 (Title)
Line 3, delete "MICOSPHERES" and insert -- MICROSPHERES --, therefor.

Column 1 (Title)
Line 3, delete "MICOSPHERES" and insert -- MICROSPHERES --, therefor.

Column 9
Line 64, delete "1 1 wt-%," and insert -- 11wt-%, --, therefor.

Line 67, delete "microsphers." and insert -- microspheres. --, therefor.

Column 11
Lines 27-28, delete "0.040°" and insert -- 0.04° --, therefor.

Column 14
Line 33 (approx.), delete "about I" and insert -- about 1 --, therefor.

Column 18
Line 32, in Claim 1, delete "micropheres" and insert -- microspheres --, therefor.

Line 38 (approx.), in Claim 1, delete "ZrO$_2$,HfO$_2$," and insert -- ZrO$_2$, HfO$_2$, --, therefor.

Line 45, in Claim 5, delete "micropheres" and insert -- microspheres --, therefor.

Line 61, in Claim 7, delete "ThO$_2$" and insert -- ThO$_2$, --, therefor.

Column 19
Line 17, in Claim 14, delete "micropheres" and insert -- microspheres --, therefor.

Signed and Sealed this

Thirtieth Day of November, 2010

David J. Kappos
*Director of the United States Patent and Trademark Office*

Column 20
Line 6, in Claim 16, delete "$La_2,O_3$" and insert -- $La_2O_3$, --, therefor.

Line 12, in Claim 17, delete "micropheres" and insert -- microspheres --, therefor.

Line 16, in Claim 17, delete "elements and" and insert -- elements, and --, therefor.